(12) United States Patent
Shin

(10) Patent No.: US 12,119,523 B2
(45) Date of Patent: Oct. 15, 2024

(54) FUEL CELL SYSTEM AND METHOD FOR CONTROLLING THE SAME

(71) Applicants: HYUNDAI MOTOR COMPANY, Seoul (KR); KIA CORPORATION, Seoul (KR)

(72) Inventor: Seung Ho Shin, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 212 days.

(21) Appl. No.: 17/893,328

(22) Filed: Aug. 23, 2022

(65) Prior Publication Data

US 2023/0223570 A1 Jul. 13, 2023

(30) Foreign Application Priority Data

Jan. 13, 2022 (KR) .................. 10-2022-0005434

(51) Int. Cl.
| | |
|---|---|
| *H01M 8/04746* | (2016.01) |
| *H01M 8/04082* | (2016.01) |
| *H01M 8/04089* | (2016.01) |
| *H01M 8/0432* | (2016.01) |
| *H01M 8/0438* | (2016.01) |
| *H01M 8/04492* | (2016.01) |
| *H01M 8/04537* | (2016.01) |
| *H01M 8/10* | (2016.01) |

(52) U.S. Cl.
CPC ... *H01M 8/04753* (2013.01); *H01M 8/04089* (2013.01); *H01M 8/04201* (2013.01); *H01M 8/0432* (2013.01); *H01M 8/0438* (2013.01); *H01M 8/04492* (2013.01); *H01M 8/04559* (2013.01); *H01M 2008/1095* (2013.01); *H01M 2250/20* (2013.01)

(58) Field of Classification Search
CPC ......... H01M 8/04753; H01M 8/04089; H01M 8/04201; H01M 8/0432; H01M 8/0438; H01M 8/04492; H01M 8/04559; H01M 8/04335; H01M 8/04365; H01M 8/04395; H01M 8/04507; H01M 8/04529; H01M 8/04552; H01M 8/04589; H01M 8/04619
See application file for complete search history.

(56) References Cited

U.S. PATENT DOCUMENTS

| | | | |
|---|---|---|---|
| 7,858,251 B2 | 12/2010 | Wake et al. | |
| 2016/0006059 A1* | 1/2016 | Kwon | B60L 58/40 429/442 |
| 2016/0293983 A1* | 10/2016 | Lee | H01M 8/04708 |

(Continued)

FOREIGN PATENT DOCUMENTS

| | | |
|---|---|---|
| CN | 108832817 A | 11/2018 |
| KR | 2012-0064204 A | 6/2012 |
| KR | 10-1461822 B1 | 11/2014 |

*Primary Examiner* — Stewart A Fraser
(74) *Attorney, Agent, or Firm* — MCDONNELL BOEHNEN HULBERT & BERGHOFF LLP

(57) ABSTRACT

A fuel cell system and a method for controlling the same may adjust generation of condensate water in a fuel cell by setting relative humidities and temperature and pressure conditions of the fuel cell so as to maintain a constant current density, and may alleviate performance deterioration of the fuel cell during operation by removing an excessive amount of the generated condensate water by injecting a cathode pressure impulse into the fuel cell.

11 Claims, 5 Drawing Sheets

(56) References Cited

U.S. PATENT DOCUMENTS

| | | | |
|---|---|---|---|
| 2018/0166717 A1* | 6/2018 | Ryu | H01M 8/04231 |
| 2018/0166719 A1* | 6/2018 | Kwon | H01M 8/04529 |
| 2019/0018067 A1 | 1/2019 | Kong et al. | |
| 2019/0131638 A1 | 5/2019 | Won et al. | |
| 2019/0181465 A1 | 6/2019 | Lee et al. | |
| 2022/0102744 A1* | 3/2022 | Ando | H01M 8/045 |

* cited by examiner

FUEL CELL SYSTEM AND METHOD FOR CONTROLLING THE SAME

CROSS REFERENCE TO RELATED APPLICATIONS

This application claims priority from Korean Patent Application No. 10-2022-0005434, filed on Jan. 13, 2022, in the Korean Intellectual Property Office, the disclosure of which is incorporated herein by reference in its entirety.

BACKGROUND

1. Field

The present disclosure relates to a fuel cell system and a method for controlling the same, which may adjust generation of condensate water in a fuel cell by setting relative humidities and temperature and pressure conditions of the fuel cell so as to maintain a constant current density, and may alleviate performance deterioration of the fuel cell during operation by removing an excessive amount of the generated condensate water by injecting a cathode pressure impulse into the fuel cell.

2. Description of the Related Art

Fuel cells produce electrical energy through electrochemical reaction between hydrogen serving as fuel and oxygen in air. These fuel cells are applied to fuel cell vehicles or the like, and the fuel cell vehicle is driven by operating an electric motor using the electrical energy produced by the fuel cell.

In general, a polymer electrolyte fuel cell (PEFC) includes a fuel cell stack including a plurality of unit cells. In each unit cell, an anode and a cathode are disposed on both sides of an electrolyte membrane so as to form a membrane electrode assembly (MEA), and the MEA is disposed between separators (bipolar plates). In the fuel cell, hydrogen serving as fuel is supplied to the anode (i.e., a fuel electrode), and oxygen is supplied to the cathode (i.e., an air electrode or an oxygen electrode).

Hydrogen supplied to the anode is split into protons and electrons by a catalyst in the anode and an n anode catalyst layer. The protons migrate to the cathode through the electrolyte membrane serving as a cation exchange membrane, and the electrons are transferred to the cathode through gas diffusion layers (GDLs) and the separators. The protons supplied through the electrolyte membrane and the electrons transferred through the separators react with oxygen at the cathode, and thus produce water.

Here, the produced water (i.e., condensate water) reduces the active surface area of catalyst layers and thus causes loss of the electrochemical reaction, and increases mass transfer resistance and thus causes voltage drop and deteriorates the performance of the fuel cell. Further, water in the fuel cell serves as a transfer medium of the protons, and thus, a proper amount of water is essentially necessary so as to operate the fuel cell.

That is, not only in a flooding condition in which condensate water overflows but also in a dry-out condition in which there is not enough condensate water, the performance of the fuel cell is deteriorated, and thus, it is necessary to properly adjust the condensate water generated in the fuel cell.

In order to solve such a problem, when the problem occurs while the conventional fuel cell vehicle is driven in a normal state for a long period of time, the fuel cell system is temporarily stopped or changed into an idle mode so as to maintain water balance, and is then reoperated.

The above information disclosed in the Background section is only for enhancement of understanding of the background of the disclosure and should not be interpreted as conventional technology that is already known to those skilled in the art.

SUMMARY

Therefore, the present disclosure has been made in view of the above problems, and it is an object of the present disclosure to provide a fuel cell system and a method for controlling the same, which may adjust generation of condensate water in a fuel cell by setting relative humidities and temperature and pressure conditions of the fuel cell so as to maintain a constant current density, and may alleviate performance deterioration of the fuel cell during operation by removing an excessive amount of the generated condensate water by injecting a cathode pressure impulse into the fuel cell.

In accordance with an aspect of the present disclosure, the above and other objects can be accomplished by the provision of a method for controlling a fuel cell system, the method including deriving, by a controller, target relative humidities of a fuel cell, deriving, by the controller, operating conditions of the fuel cell so as to achieve the target relative humidities of the fuel cell, controlling, by the controller, operation of the fuel cell based on the derived operating conditions, and measuring output voltage of the fuel cell, and controlling, by the controller, an air supplier of the fuel cell to form an impulse so as to supply air to the fuel cell when the output voltage of the fuel cell is less than a target output voltage reference.

In the deriving the target relative humidities, target relative humidities of channels of an anode and a cathode may be derived, and target temperature and pressure conditions of the channels depending on the target relative humidities of the channels may be derived, and, in the deriving the operating conditions, the operating conditions of the fuel cell may be derived depending on the derived target temperature and pressure conditions of the channels.

The target relative humidities of the channels of the anode and cathode may be relative humidities configured to allow a current density, set depending on the target output voltage reference of the vehicle which is set, to be maintained uniformly.

In the deriving the target relative humidities, an expected relative humidity of a reaction part of the fuel cell other than the channels may be derived through the derived target temperature and pressure conditions of the channels, and the target temperature and pressure conditions of the channels may be corrected so as to allow the expected relative humidity of the reaction part to satisfy a target relative humidity of the reaction part, and, in the deriving the operating conditions, the operating conditions of the fuel cell may be derived depending on the corrected target temperature and pressure conditions of the channels.

In deriving the target relative humidities, the target relative humidities of the channels of the anode and the cathode may be corrected and the target temperature and pressure conditions of the channels depending on the corrected target relative humidities of the channels may be rederived, when the target temperature and pressure conditions of the channels of the anode and the cathode do not correspond to ranges of minimum temperature and maximum pressure conditions, and, in the deriving the operating conditions, the operating conditions of the fuel cell may be derived depending on the rederived temperature and pressure conditions of the channels corresponding to the corrected target relative humidities.

In the deriving the target relative humidities, the target relative humidities of the channels of the anode and the cathode may be corrected and the target temperature and pressure conditions of the channels depending on the corrected target relative humidities of the channels may be rederived, when the corrected target temperature and pressure conditions of the channels of the anode and the cathode do not correspond to ranges of minimum temperature and maximum pressure conditions, and, in the deriving the operating conditions, the operating conditions of the fuel cell may be derived depending on the rederived target temperature and pressure conditions of the channels corresponding to the corrected target relative humidities.

The controlling the air supplier may include comparing the measured output voltage with the target output voltage reference, and forming a cathode pressure impulse by controlling the air supplier of the fuel cell depending on a result of comparison, and injecting the formed cathode pressure impulse into the fuel cell.

The method may further include, after the injecting the formed cathode pressure impulse into the fuel cell, measuring the output voltage depending on injection of the cathode pressure impulse, comparing the measured output voltage with the target output voltage reference, and controlling the air supplier depending on a result of comparison so as to correct the cathode pressure impulse.

The output voltage depending on injection of the cathode pressure impulse, measured by the controller, may be a section voltage measured every predetermined time.

The method may further include, after the forming the cathode pressure impulse, comparing a pressure value of the formed cathode pressure impulse with a predetermined limit pressure value, and determining whether or not the cathode pressure impulse is injected into the fuel cell depending on a result of comparison.

When the pressure value of the formed cathode pressure impulse reaches the predetermined limit pressure value, the controller may correct a current density depending on the target output voltage reference.

In accordance with another aspect of the present disclosure, there is provided a fuel cell system including a fuel cell stack including channels of an anode and a cathode and a reaction part between the two channels, a hydrogen supplier configured to supply hydrogen to the channel of the anode of the fuel cell stack, an air supplier configured to supply air to the channel of the cathode of the fuel cell stack, and a controller configured to derive target relative humidities of a fuel cell and operating conditions of the fuel cell depending on the target relative humidities, to control operation of the fuel cell based on the derived operating conditions, to measure output voltage of the fuel cell, and to control the air supplier of the fuel cell to form an impulse so as to supply air to the fuel cell when the output voltage of the fuel cell is less than a target output voltage reference.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

In the following description of embodiments of the present disclosure, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Further, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

Hereinafter, the configurations and functional principles of various embodiments of the present disclosure will be described in detail with reference to the accompanying drawings.

Figure 1:
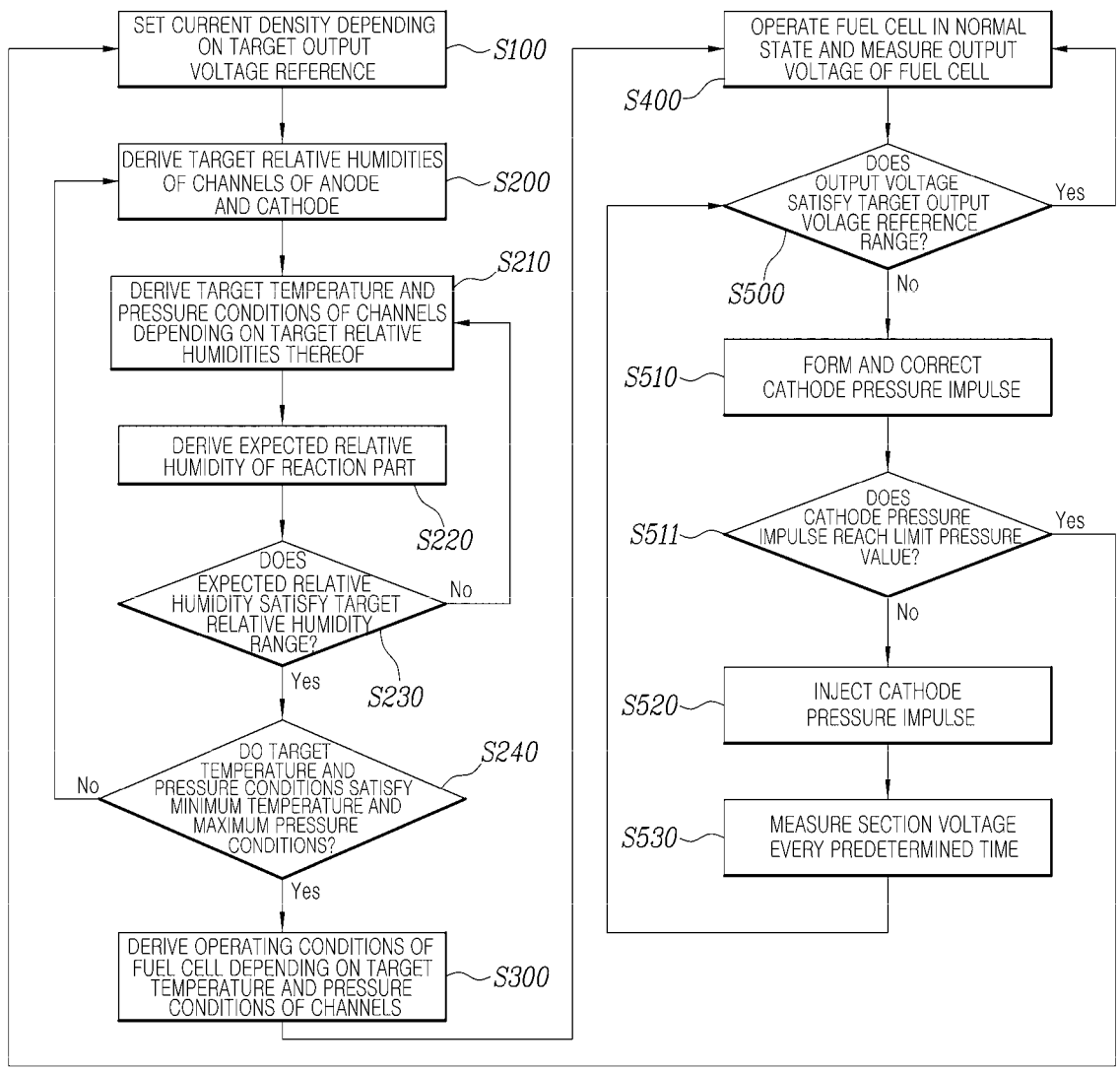
FIG. 1 is a flowchart representing a method for controlling a fuel cell system according to one embodiment of the present disclosure.
Figure 3:
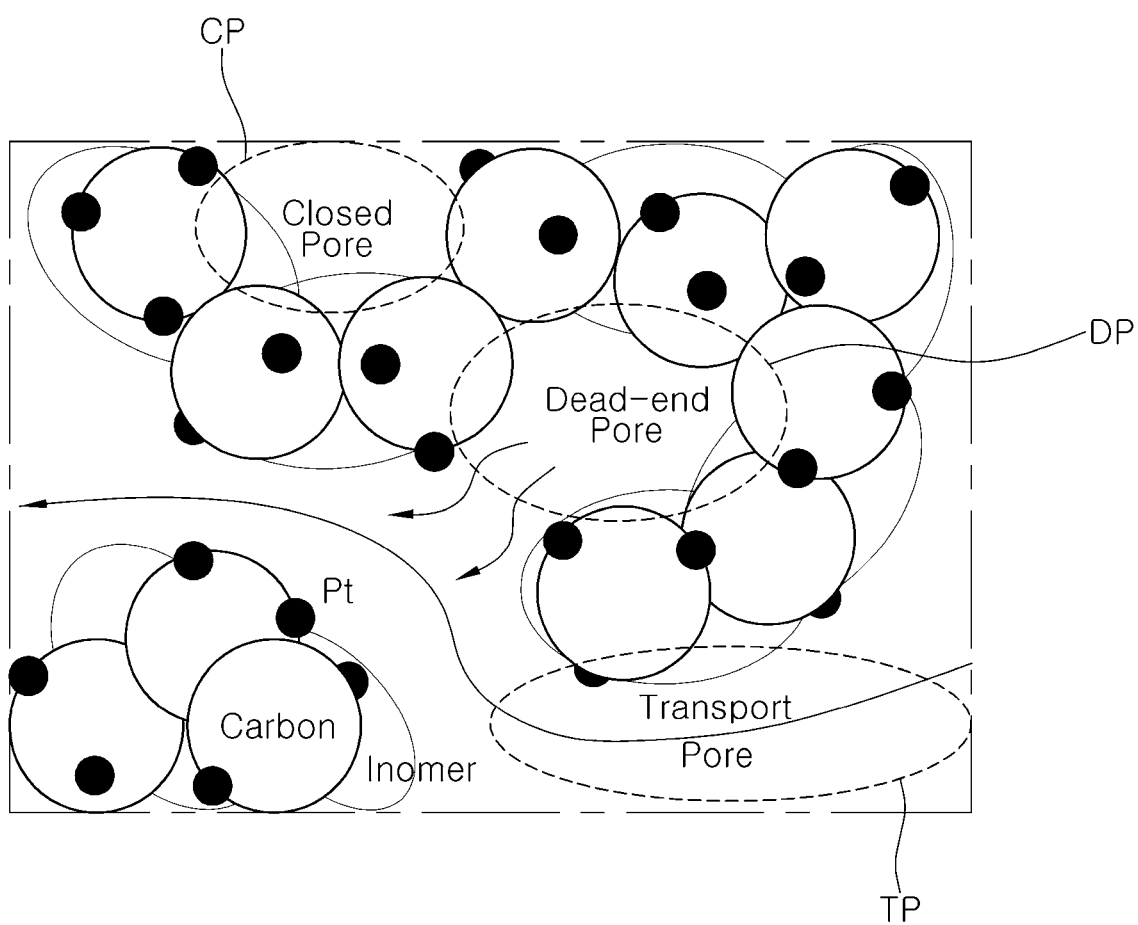
FIG. 3 is a view illustrating the inner state of the fuel cell stack before a cathode pressure impulse is injected in the method for controlling the fuel cell system according to one embodiment of the present disclosure.
Figure 5:
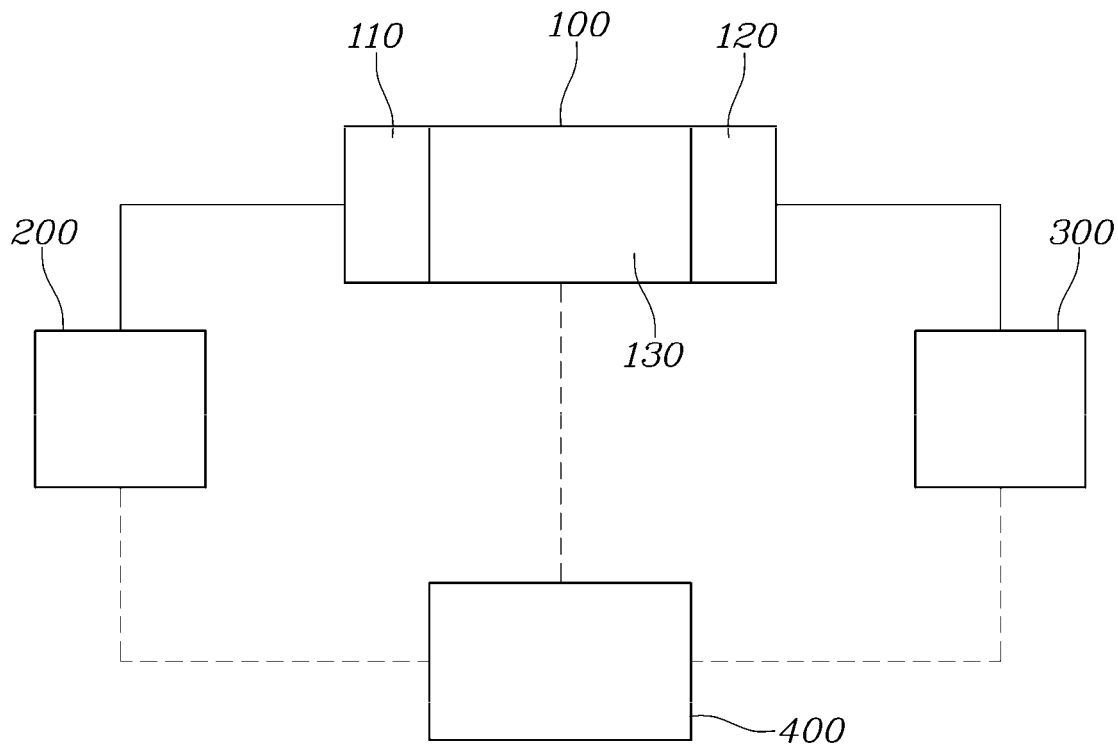
FIG. 5 is a view illustrating the fuel cell system according to one embodiment of the present disclosure.

FIG. 1 is a flowchart representing a method for controlling a fuel cell system according to one embodiment of the present disclosure, FIG. 3 is a view illustrating the inner state of a fuel cell stack before a cathode pressure impulse is injected in the method for controlling the fuel cell system according to one embodiment of the present disclosure, and FIG. 5 is a view illustrating the fuel cell system according to one embodiment of the present disclosure.

Referring to FIG. 1, the method for controlling the fuel cell system according to the present disclosure includes deriving, by a controller, target relative humidities of a fuel cell (S200, S210, S220, S230 and S240), deriving, by the controller, operating conditions of the fuel cell so as to achieve the target relative humidities of the fuel cell (S300), controlling, by the controller, operation of the fuel cell based on the derived operating conditions, and measuring output voltage of the fuel cell (S400), and controlling, by the controller, an air supplier of the fuel cell to form an impulse so as to supply air to the fuel cell when the output voltage of the fuel cell is less than a target output voltage reference (S500, S510, S511, S520 and S530).

The controller according to one exemplary embodiment of the present disclosure may be implemented through a non-volatile memory (not shown) configured to store an algorithm configured to control operations of various elements of a vehicle or data regarding software commands for reproducing the algorithm and a processor (not shown)

configured to perform operations which will be described below using the data stored in the corresponding memory. Here, the memory and the processor may be implemented as individual chips. Alternatively, the memory and the processor may be implemented as a single integrated chip, and the processor may be provided in the form of one or more processors.

In general, the fuel cell stack includes an anode, a cathode, catalyst layers, diffusion layers, and a membrane. Hydrogen supplied to the anode of the fuel cell stack is split into protons and electrons by a catalyst in the anode and the anode catalyst layer, and the protons and the electrons react with oxygen at the cathode to produce water. The produced water (i.e., condensate water) increases mass transfer resistance and thus causes voltage drop, and such voltage drop tends to be proportional to the relative humidity at the interface between the cathode and the cathode catalyst layer.

Voltage drop is directly linked to performance deterioration of the fuel cell, and thus, the method for controlling the fuel cell system according to the present disclosure is executed such that the controller derives the target relative humidities of the fuel cell so as to improve such voltage drop. That is, the operating conditions of the fuel cell depending on the target relative humidities so as to improve voltage drop are derived at S300, and operation of the fuel cell is controlled based on the derived operating condition, thereby being capable of improving performance deterioration of the fuel cell.

For reference, in the following description of the present disclosure, the state in which operation of the fuel cell is controlled based on the operating conditions corresponding to the target relative humidities will be defined as a normal state or normal state operation.

The method for controlling the fuel cell system according to the present disclosure may be applied to fuel cell vehicles or the like, and the required target output voltage of the fuel cell is changed depending on the driving speed of a vehicle or the inclination of a road during driving of the vehicle. Therefore, depending on various driving situations, it is necessary to measure the actual output voltage of the fuel cell during operation of the fuel cell in the normal state and to compare the measured actual output voltage with the target output voltage reference.

That is, it may be understood that the reason why the fuel cell is controlled based on the derived operating conditions and the output voltage of the fuel cell is measured at S400 is to cope with various driving situations which may be caused during driving of the vehicle to which the method for controlling the fuel cell system according to the present disclosure is applied.

The method for controlling the fuel cell system according to the present disclosure includes controlling, by the controller, the air supplier of the fuel cell to form the impulse so as to supply air to the fuel cell when the output voltage of the fuel cell is less than the target output voltage reference (S500, S510, S511, S520 and S530).

When the fuel cell system is operated in the normal state for a long period of time, condensate water is accumulated in unit cells of the fuel cell. As described above, the condensate water increases mass transfer resistance and thus causes voltage drop, and therefore, in the flooding condition in which an excessive amount of condensate water is accumulated, the output voltage of the fuel cell, which is lower than the target output voltage reference, is measured.

Accordingly, in this case, it is necessary to properly remove the excessive amount of the accumulated condensate water. For this purpose, the method for controlling the fuel cell system according to the present disclosure includes controlling the air supplier of the fuel cell to form the impulse so as to supply air to the fuel cell (S500, S510, S511, S520 and S530), thereby removing the excessive amount of the accumulated condensate water through the formed impulse. FIG. 3 illustrates the state of the fuel cell stack before the condensate water is removed, and this state will be additionally described in detail with reference to the respective operations of the method according to the present disclosure and the functional principles thereof.

In the method for controlling the fuel cell system according to the present disclosure, in the deriving the target relative humidities (S200, S210, S220, S230 and S240), the target relative humidities of channels of the anode and the cathode may be derived (S200), and the target temperature and pressure conditions of the channels depending on the target relative humidities of the channels may be derived (S210), and, in the deriving the operating conditions (S300), the operating conditions of the fuel cell may be derived depending on the derived target temperature and pressure conditions of the channels.

Relative humidity means a value acquired by dividing the vapor pressure at a specific temperature by the saturation vapor pressure at this temperature, and is thus expressed as a function of temperature and pressure. Therefore, when a target relative humidity is set, target temperature and pressure conditions depending on the target relative humidity are derived.

Specifically, in the method for controlling the fuel cell system according to the present disclosure, in the deriving the target relative humidities (S200, S210, S220, S230 and S240), the target relative humidities of the channels of the anode and the cathode of the fuel cell are derived (S200), and the target temperature and pressure conditions of the channels depending on the target relative humidities of the channels are derived (S210). Further, in the deriving the operating conditions (S300), the operating conditions of the fuel cell are derived depending on the derived target temperature and pressure conditions of the channels. Consequently, the fuel cell is controlled to be operated in the normal state based on the derived operating conditions, and thus, performance deterioration of the fuel cell may be improved.

Here, the operating conditions derived depending on the target temperature and pressure conditions of the channels are achieved by adjusting temperature using a cooling apparatus which is separately provided such that a coolant flows therein and adjusting the pressure of gases supplied to the fuel cell from a hydrogen supplier and the air supplier.

The target relative humidities of the channels of the anode and cathode may be relative humidities configured to allow a current density, set depending on the target output voltage reference of the vehicle which is set at S100, to be maintained uniformly.

The catalyst layers, which are core parts of the fuel cell, are deteriorated more rapidly at the part of the catalyst layers having a high current density. Therefore, in order to secure durability of the fuel cell and stable operation of the fuel cell, uniform distribution of a current density may be achieved throughout the entirety of the reaction area of the fuel cell. The distribution of the current density is influenced by the relative humidities of the channels of the anode and the cathode, and thus, in order to improve uniformity of the current density, it is necessary to adjust the relative humidities of the channels.

Accordingly, in the method for controlling the fuel cell system according to the present disclosure, a constant current density is set, and operation of the fuel cell is controlled based on the target relative humidities of the channels of the anode and the cathode which allow the set current density to be maintained uniformly, thereby ultimately achieving stable operation of the fuel cell in the normal state and securing durability of the fuel cell.

As described above, the required target output voltage of the fuel cell is varied depending on various driving situations of the vehicle. The constant current density set based on the method for controlling the fuel cell system according to the present disclosure may be understood as a current density derived to correspond to the target output voltage reference of the fuel cell which is frequently varied during driving of the vehicle.

In the method for controlling the fuel cell system according to the present disclosure, in the deriving the target relative humidities (S200, S210, S220, S230 and S240), an expected relative humidity of a reaction part other than the channels of the fuel cell are derived through the derived target temperature and pressure conditions of the channels at S220), the target temperature and pressure conditions of the channels are corrected so that the expected relative humidity of the reaction part satisfies a target relative humidity of the reaction part at S230, and, in the deriving the operating conditions at (S300, the operating conditions of the fuel cell may be derived depending on the corrected target temperature and pressure conditions of the channels.

Here, the reaction part indicates the remainder of the fuel cell stack other than the channels of the anode and the cathode. That is, in the description of the present disclosure, among the elements of the general fuel cell stack, a region including the catalyst layers, the diffusion layers and the membrane other than the anode and the cathode will be defined as the reaction part.

Figure 2:
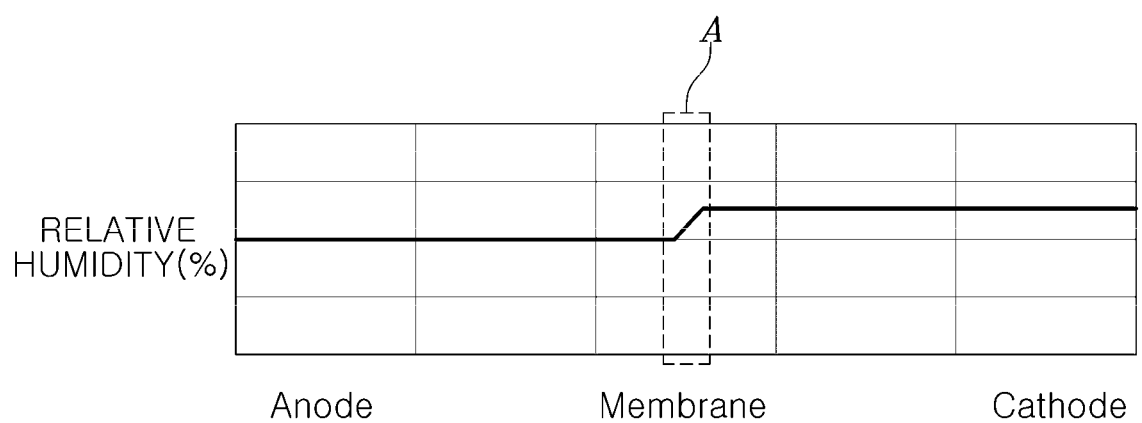
FIG. 2 is a graph illustrating a distribution of relative humidities at the respective inner positions of a fuel cell stack of the fuel cell system according to one embodiment of the present disclosure.

Further, the expected relative humidity of the reaction part will be additionally described with reference to FIG. 2. FIG. 2 is a graph illustrating a distribution of relative humidities at the respective inner positions of the fuel cell stack of the fuel cell system according to one embodiment of the present disclosure.

As described above, hydrogen supplied to the anode is split into protons and electrons by the catalyst, the protons and the electrons react with oxygen at the cathode to produce water, and thereby, the target relative humidity of the channel of the cathode is set to be higher than the target relative humidity of the channel of the anode.

As the target relative humidity of the channel of the anode and the target relative humidity of the channel of the cathode are set to different values, the relative humidity distribution of the reaction part may form a constant gradient, as shown in a region A of FIG. 2. That is, error range distribution data of the target relative humidity of the reaction part may be acquired by measuring gradient values through a plurality of experiments.

Distribution values dataized in this way are stored in a main memory of the controller as the target relative humidities of the reaction part. The expected relative humidity of the reaction part derived through the target temperature and pressure conditions of the channels is compared to the target relative humidities of the reaction part. When the expected relative humidity of the reaction part deviates from the range of the target relative humidities of the reaction part as a result of comparison, a process of rederiving the expected relative humidity of the reaction part by correcting the target temperature and pressure conditions of the channels and comparing the rederived expected relative humidity with the range of the target relative humidities until the rederived expected relative humidity satisfies the range of the target relative humidities is repeated.

When the expected relative humidity satisfies the range of the target relative humidities, the operating conditions of the fuel cell are derived depending on the target temperature and pressure conditions of the channels at this moment. Consequently, the fuel cell is controlled based on the derived operating conditions so as to be operated in the normal state, and thereby, performance deterioration of the fuel cell may be improved.

Further, in the method for controlling the fuel cell system according to the present disclosure, in the deriving the target relative humidities (S200, S210, S220, S230 and S240), the target relative humidities of the channels of the anode and the cathode are corrected and the target temperature and pressure conditions of the channels depending on the corrected target relative humidities of the channels are rederived, when the target temperature and pressure conditions of the channels of the anode and the cathode do not correspond to ranges of minimum temperature and maximum pressure conditions at S240, and, in the deriving the operating conditions at S300, the operating conditions of the fuel cell may be derived depending on the rederived target temperature and pressure conditions of the channels corresponding to the corrected target relative humidities.

Relative humidity increases as the temperature of gas decreases and the pressure of the gas increases, and decreases as the temperature of the gas increases and the pressure of the gas decreases. That is, in the method for controlling the fuel cell system according to the present disclosure, the minimum temperature and maximum pressure conditions of the channels of the anode and the cathode are set as limiting conditions so that the target relative humidities of the channels of the anode and cathode are not increased to a designated value or more, and thus prevents the target relative humidities from excessively increasing.

Further, in the method for controlling the fuel cell system according to the present disclosure, in the deriving the target relative humidities (S200, S210, S220, S230 and S240), the target relative humidities of the channels of the anode and the cathode are corrected and the target temperature and pressure conditions of the channels depending on the corrected target relative humidities of the channels are rederived, when the corrected target temperature and pressure conditions of the channels of the anode and the cathode do not correspond to the ranges of minimum temperature and maximum pressure conditions at S240, and, in the deriving the operating conditions at S300, the operating conditions of the fuel cell may be derived depending on the rederived target temperature and pressure conditions of the channels corresponding to the corrected target relative humidities.

In order to prevent the target relative humidities of the channels of the anode and cathode from increasing to the designated value or more even in case that the target temperature and pressure conditions of the channels are corrected so that the expected relative humidity of the reaction part satisfies the target relative humidity of the reaction part, the above-described limiting condition is applied to the corrected target temperature and pressure condition of the channels so as to prevent the target relative humidities of the channels from excessively increasing.

That is, the target relative humidity of the reaction part including the catalyst layers is prevented from excessively increasing, and thereby, voltage drop, which is proportional to the relative humidifies of the interfaces with the catalyst layers, may be alleviated within a designated range.

Further, in the method for controlling the fuel cell system according to the present disclosure, the controlling the air supplier (S500, S511, S520 and S530) may include comparing the measured output voltage with the target output voltage reference at S500, forming a cathode pressure impulse by controlling the air supplier of the fuel cell depending on a result of comparison at S510, and injecting the formed cathode pressure impulse into the fuel cell at S520.

As described above, when the fuel cell system is operated in the normal state for a long period of time, condensate water is accumulated in the unit cells of the fuel cell. Further, in the flooding condition in which an excessive amount of condensate water is accumulated, the output voltage of the fuel cell, which is lower than the target output voltage reference, is measured. Therefore, in the method for controlling the fuel cell system according to the present disclosure, the output voltage of the fuel cell is measured, and whether or not the output voltage satisfies the range of the target output voltage reference at S500.

Specifically, when the output voltage satisfies the range of the target output voltage reference, operation of the fuel cell in the normal state is maintained. When the output voltage deviates from the range of the target output voltage reference, it is determined that the fuel cell is in the flooding condition, and thus, in order to remove the excessive amount of the accumulated condensate water, the controller controls the air supplier of the fuel cell.

The flooding condition in which an excessive amount of condensate water is accumulated will be described with reference to FIG. 3. FIG. 3 is a view illustrating the inner state of the fuel cell stack before a cathode pressure impulse is injected in the method for controlling the fuel cell system according to one embodiment of the present disclosure.

A plurality of microporous layers is generally formed in the gas diffusion layer in the fuel cell, and the microporous layers serve to discharge water generated in the catalyst layer to the outside of the fuel cell. The microporous layer, as shown in FIG. 3, may be divided into limited electrochemical reaction regions (i.e., including closed pores CP), activated electrochemical reaction regions (i.e., including transport pores TP), and partially limited electrochemical reaction regions (i.e., including dead-end pores DP). The condensate water generated during operation of the fuel cell is accumulated in the dead-end pores DP.

The accumulated condensate water may be discharged from the dead-end pores DP to the transport pores TP by injecting high-pressure air through the air supplier, and may be transported by the flow of the high-pressure air, thereby being capable of being removed.

Specifically, the controller generates an impulse so that the air supplier forms high-pressure air on a regular cycle. That is, the controller forms a cathode pressure impulse and injects the formed impulse into the fuel cell, thus removing the excessive amount of the accumulated condensate water.

After the injecting the formed cathode pressure impulse to the fuel cell at S520, the output voltage of the fuel cell depending on injection of the cathode pressure impulse may be measured, the measured output voltage may be compared with the target output voltage reference, and the cathode pressure impulse may be corrected by controlling the air supplier of the fuel cell depending on a result of comparison at S530.

That is, after the formed cathode pressure impulse is injected into the fuel cell, whether or not the output voltage changed depending on injection of the cathode pressure impulse satisfies the range of the target output voltage reference is determined, and thereby, whether or not the excessive amount of the accumulated condensate water is properly discharged may be confirmed.

Specifically, when the output voltage changed depending on injection of the cathode pressure impulse satisfies the range of the target output voltage reference, it is not necessary to form and inject the cathode pressure impulse anymore, and thus, the controller stops controlling the air supplier of the fuel cell, and maintains operation of the fuel cell in the normal state. When the output voltage changed depending on injection of the cathode pressure impulse deviates from the range of the target output voltage reference, it is determined that the fuel cell is still in the flooding condition, and thus, in order to remove the excessive amount of the accumulated condensate water, the controller continues controlling the air supplier of the fuel cell.

The controller corrects the cathode pressure impulse so as to increase the pressure value thereof, and injects the corrected cathode pressure impulse to the fuel cell so as to additionally remove the amount of the condensed water which remains without being discharged by the previously injected cathode pressure impulse.

Here, the output voltage depending on injection of the cathode pressure impulse, measured by the controller, may be a section voltage which is measured every predetermined time.

An output voltage value measured during driving of the vehicle is generally measured in the form of waves, and thus, a deviation of the voltage value measured every moment occurs. Therefore, it is necessary to set a designated time period to a section and to measure section voltages for the time period. That is, the average of the measured section voltages is defined as an output voltage, and whether or not the output voltage satisfies the range of the target output voltage reference is determined by comparing the output voltage with the target output voltage reference.

When the section voltages are used as the output voltage, an error caused by the deviation of the output voltage may be reduced. That is, reliability of the method for controlling the fuel cell system according to the present disclosure may be improved by comparing the output voltage, which is measured more precisely, with the target output voltage reference.

After the forming the cathode pressure impulse at S510, the pressure value of the formed cathode pressure impulse is compared with a predetermined limit pressure value, and whether or not the cathode pressure impulse is injected into the fuel cell may be determined depending on a result of comparison at S511.

Water in the fuel cell serves as a transfer medium of protons. Therefore, a proper amount of water is absolutely necessary so as to operate the fuel cell, and performance deterioration of the fuel cell occurs not only in the flooding condition in which condensate water overflows but also in the dry-out condition in which there is not enough condensate water.

In order to prevent occurrence of the dry-out condition, the method for controlling the fuel cell system further includes comparing the pressure value of the cathode pressure impulse injected into the fuel cell with the predetermined limit pressure value and determining whether or not the cathode pressure impulse is additionally injected into the fuel cell depending on a result of comparison at S511.

Specifically, when the cathode pressure impulse injected into the fuel cell reaches the predetermined limit pressure value, injection of the cathode pressure impulse is stopped, and thereby, the fuel cell is prevented from being in the dry-out condition in which there is not enough condensate water. When the cathode pressure impulse injected into the fuel cell does not reach the predetermined limit pressure value, the fuel cell is determined as being still in the flooding condition, and the controller corrects the cathode pressure impulse so as to increase the pressure value thereof, and injects the corrected cathode pressure impulse to the fuel cell so as to additionally remove the amount of the condensed water which remains without being discharged by the previously injected cathode pressure impulse.

Whether or not the cathode pressure impulse is injected into the fuel cell is determined in this way, and thereby, condensate water produced in the fuel cell may be properly adjusted so as to prevent both the flooding condition and the dry-out condition.

Further, in the method for controlling the fuel cell system according to the present disclosure, the controller may correct a current density depending on the target output voltage reference, when the pressure value of the formed cathode pressure impulse reaches the predetermined limit pressure value.

When the pressure value of the cathode pressure impulse injected into the fuel cell reaches the predetermined limit pressure value, although injection of the cathode pressure impulse is stopped, the dry-out condition has already occurred. Further, although the dry-out condition does not occur, the relative humidities in the fuel cell have already been lowered and, thus, it is necessary to adjust the relative humidities to proper relative humidities in order to satisfy the target output voltage reference.

When the cathode pressure impulse is injected into the fuel cell, the current density of an air inlet at the cathode in the fuel cell is temporarily increased immediately after injection of the cathode pressure impulse. Therefore, after injection of the cathode pressure impulse is performed once or several times, there is a need to reset the current density depending on the target output voltage reference in order to adjust the relative humidities of the channels of the anode and the cathode again.

Therefore, in the method for controlling the fuel cell system according to the present disclosure, when the pressure value of the formed cathode pressure impulse reaches the predetermined limit pressure value, the controller corrects the current density depending on the target output voltage reference, and thereby, adjusts the target relative humidities of the channels of the anode and the cathode to proper relative humidities again.

Figure 4:
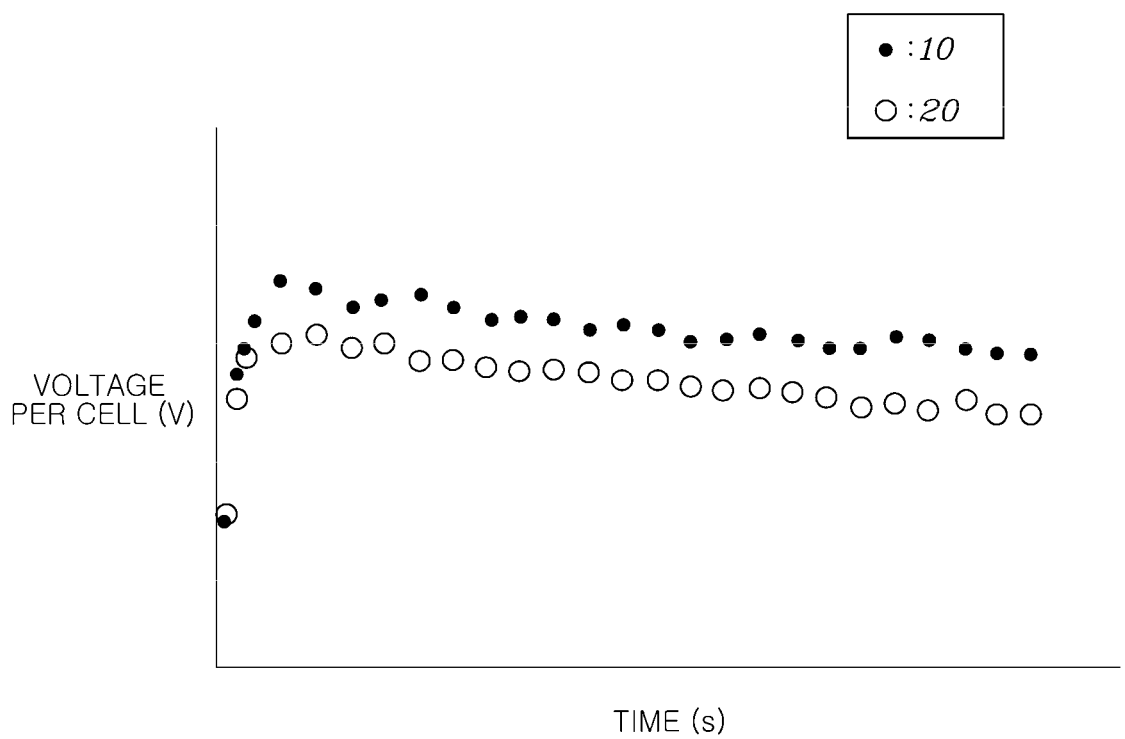
FIG. 4 is a graph illustrating improvement in voltage drop by applying operating conditions based on the fuel cell system and the method for controlling the same according to one embodiment of the present disclosure.

FIG. 4 is a graph illustrating improvement in voltage drop by applying operating conditions based on the fuel cell system and the method for controlling the same according to one embodiment of the present disclosure, and FIG. 5 is a view illustrating the fuel cell system according to one embodiment of the present disclosure.

Referring to FIG. 5, the fuel cell system according to the present disclosure may include a fuel cell stack 100 including channels 110 and 120 of an anode and a cathode and a reaction part 130 between the two channels 110 and 120, a hydrogen supplier 200 configured to supply hydrogen to the channel 110 of the anode of the fuel cell stack 100, an air supplier 300 configured to supply air to the channel 120 of the cathode of the fuel cell stack 100, and a controller 400 configured to derive target relative humidities of a fuel cell and operating conditions of the fuel cell depending on the target relative humidities, to control operation of the fuel cell based on the derived operating conditions, to measure output voltage of the fuel cell, and to control the air supplier 300 of the fuel cell to form an impulse so as to supply air to the fuel cell when the output voltage of the fuel cell is less than a target output voltage reference.

Here, the reaction part 130 means the remainder of the fuel cell stack 100 other than the channels 110 and 120 of the anode and the cathode, as described above. Hydrogen gas is supplied from the hydrogen supplier 200 to the channel 110 of the anode of the fuel cell stack 100, and air is supplied from the air supplier 300 to the channel 120 of the cathode of the fuel cell stack 100. The controller 400 derives the target relative humidities of the fuel cell and the operating conditions of the fuel cell depending on the target relative humidities, controls operation of the fuel cell based on the derived operating conditions, measures the output voltage of the fuel cell during operation of the fuel cell, and controls the air supplier 300 of the fuel cell to form a cathode pressure impulse so as to supply air to the fuel cell 300 when the output voltage of the fuel cell is less than the target output voltage reference. The process of deriving the target relative humidities and the operating conditions, controlling operation of the fuel cell depending on the operating conditions, measuring the output voltage, and controlling the air supplier 300, which is executed by the controller 400, has been described above.

Referring to FIG. 4, it may be confirmed that voltage per cell tends to decrease as time passes. The reason for this is that voltage drop occurs due to accumulation of condensate water in the fuel cell when the fuel cell is operated for a long period of time.

Here, as a result comparison between the case 10 in which the operating conditions according to the present disclosure are applied and the case 20 in which the operating conditions according to the present disclosure are not applied, it may be seen that voltage drop occurs less when the operating conditions according to the present disclosure are applied.

Accordingly, when the operating conditions based on the fuel cell system and the method for controlling the same according to one embodiment of the present disclosure are applied, voltage drop occurring during operation of the fuel cell system in the normal state for a long period of time may be improved, and thereby, the output of the fuel cell system may be recovered and performance deterioration of the fuel cell system may be alleviated.

As is apparent from the above description, a fuel cell system and a method for controlling the same according to the present disclosure may adjust generation of condensate water in a fuel cell by setting relative humidities and temperature and pressure conditions of the fuel cell so as to maintain a constant current density, and may alleviate performance deterioration of the fuel cell during operation by removing an excessive amount of the generated condensate water by injecting a cathode pressure impulse into the fuel cell.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A method for controlling a fuel cell system, the method comprising:
  deriving, by a controller, target relative humidities of a fuel cell;
  deriving, by the controller, operating conditions of the fuel cell to achieve the target relative humidities of the fuel cell;

controlling, by the controller, operation of the fuel cell based on the derived operating conditions, and measuring output voltage of the fuel cell; and controlling, by the controller, an air supplier of the fuel cell to form an impulse to supply air to the fuel cell when the output voltage of the fuel cell is less than a target output voltage reference;

wherein controlling the air supplier comprises:

comparing the measured output voltage with the target output voltage reference, and forming a cathode pressure impulse by controlling the air supplier of the fuel cell depending on a result of comparison; and injecting the formed cathode pressure impulse into the fuel cell.

2. The method according to claim 1, wherein, in the deriving the target relative humidities, target relative humidities of channels of an anode and a cathode are derived, and target temperature and pressure conditions of the channels depending on the target relative humidities of the channels are derived, and, in the deriving the operating conditions, the operating conditions of the fuel cell are derived depending on the derived target temperature and pressure conditions of the channels.

3. The method according to claim 2, wherein the target relative humidities of the channels of the anode and cathode are relative humidities configured to allow a current density, set depending on the target output voltage reference of the fuel cell vehicle which is set, to be maintained uniformly.

4. The method according to claim 2, wherein, in the deriving the target relative humidities, an expected relative humidity of a reaction part of the fuel cell other than the channels are derived through the derived target temperature and pressure conditions of the channels, and the target temperature and pressure conditions of the channels are corrected to allow the expected relative humidity of the reaction part to satisfy a target relative humidity of the reaction part, and, in the deriving the operating conditions, the operating conditions of the fuel cell are derived depending on the corrected target temperature and pressure conditions of the channels.

5. The method according to claim 2, wherein, in the deriving the target relative humidities, the target relative humidities of the channels of the anode and the cathode are corrected and the target temperature and pressure conditions of the channels depending on the corrected target relative humidities of the channels are rederived, when the target temperature and pressure conditions of the channels of the anode and the cathode do not correspond to ranges of minimum temperature and maximum pressure conditions, and, in the deriving the operating conditions, the operating conditions of the fuel cell are derived depending on the rederived temperature and pressure conditions of the channels corresponding to the corrected target relative humidities.

6. The method according to claim 4, wherein, in the deriving the target relative humidities, the target relative humidities of the channels of the anode and the cathode are corrected, and the target temperature and pressure conditions of the channels depending on the corrected target relative humidities of the channels are rederived, when the corrected target temperature and pressure conditions of the channels of the anode and the cathode do not correspond to ranges of minimum temperature and maximum pressure conditions, and, in the deriving the operating conditions, the operating conditions of the fuel cell are derived depending on the rederived target temperature and pressure conditions of the channels corresponding to the corrected target relative humidities.

7. The method according to claim 1, further comprising, after the injecting the formed cathode pressure impulse into the fuel cell:

measuring the output voltage depending on injection of the cathode pressure impulse, comparing the measured output voltage with the target output voltage reference, and controlling the air supplier depending on a result of comparison so as to correct the cathode pressure impulse.

8. The method according to claim 7, wherein the output voltage depending on injection of the cathode pressure impulse, measured by the controller, is a section voltage measured every predetermined time.

9. The method according to claim 1, further comprising, after the forming the cathode pressure impulse:

comparing a pressure value of the formed cathode pressure impulse with a predetermined limit pressure value, and determining whether or not the cathode pressure impulse is injected into the fuel cell depending on a result of comparison.

10. The method according to claim 9, wherein, when the pressure value of the formed cathode pressure impulse reaches the predetermined limit pressure value, the controller corrects a current density depending on the target output voltage reference.

11. A fuel cell system comprising:

a fuel cell stack comprising channels of an anode and a cathode, and a reaction part formed between the two channels;

a hydrogen supplier configured to supply hydrogen to the channel of the anode of the fuel cell stack;

an air supplier configured to supply air to the channel of the cathode of the fuel cell stack; and a controller configured to derive target relative humidities of a fuel cell and operating conditions of the fuel cell depending on the target relative humidities, to control operation of the fuel cell based on the derived operating conditions, to measure output voltage of the fuel cell, and to control the air supplier of the fuel cell to form an impulse so as to supply air to the fuel cell when the output voltage of the fuel cell is less than a target output voltage reference;

wherein controlling the air supplier comprises:

comparing the measured output voltage with the target output voltage reference, and forming a cathode pressure impulse by controlling the air supplier of the fuel cell depending on a result of comparison; and injecting the formed cathode pressure impulse into the fuel cell.

* * * * *